(12) United States Patent
Aymar (10) Patent No.: US 7,270,222 B1
(45) Date of Patent: Sep. 18, 2007

(54) EXTERNALLY ADJUSTABLE INTERNAL BYPASS SHOCK ABSORBER

(76) Inventor: Brandon Aymar, 9401 Carlton Oaks Dr., Unit D, Santee, CA (US) 92071

( * ) Notice: Subject to any disclaimer, the term of this patent is extended or adjusted under 35 U.S.C. 154(b) by 103 days.

(21) Appl. No.: 11/088,640

(22) Filed: Mar. 23, 2005

Related U.S. Application Data (60) Provisional application No. 60/555,837, filed on Mar. 23, 2004.

(51) Int. Cl.
*F16F 9/48* (2006.01)

(52) U.S. Cl. ............... 188/285; 188/287; 188/315; 188/322.19

(58) Field of Classification Search ........... 188/185, 188/286, 287, 315, 322.19; 267/175, 177, 267/179
See application file for complete search history.

(56) References Cited

U.S. PATENT DOCUMENTS

| | | | | |
|---|---|---|---|---|
| 2,048,037 A | * | 7/1936 | Smith | 188/281 |
| 3,731,770 A | * | 5/1973 | Bindon | 188/285 |
| 3,843,107 A | * | 10/1974 | Atkins | 267/64.15 |
| 4,056,040 A | * | 11/1977 | Fussangel | 91/25 |
| 4,174,098 A | * | 11/1979 | Baker et al. | 267/221 |
| 4,673,067 A | * | 6/1987 | Munning et al. | 188/266.4 |
| 5,044,614 A | * | 9/1991 | Rau | 267/221 |
| 5,178,239 A | * | 1/1993 | Homme | 188/315 |
| 5,465,642 A | * | 11/1995 | Goto | 84/293 |
| 5,799,758 A | * | 9/1998 | Huang | 188/285 |
| 6,415,895 B2 | * | 7/2002 | Marking et al. | 188/287 |

* cited by examiner

*Primary Examiner*—Robert A. Siconolfi
*Assistant Examiner*—Vu Q. Nguyen
(74) *Attorney, Agent, or Firm*—Richard D. Clarke (57) ABSTRACT

A shock absorber that combines both the suspension function and the shock absorbing function in one unit. It has an elongated shock body filled with hydraulic fluid and a piston mounted on a piston rod that reciprocally travels within the shock body. The shock body is telescopically received in a bypass cylinder body having a greater diameter that produces an annular chamber between the outer surface of the shock body and the inner surface of the bypass cylinder body. A coil spring is mounted on the outside surface of the bypass cylinder body to provide a suspension function by the shock absorber. A plurality of bypass tubes are associated with longitudinally spaced ports in the shock body. Adjuster rods are telescopically received inside the respective bypass tubes for controlling whether the individual ports are closed, partially open, or fully open. These adjuster rods would be manipulated externally of the shock absorber assembly.

14 Claims, 7 Drawing Sheets

EXTERNALLY ADJUSTABLE INTERNAL BYPASS SHOCK ABSORBER

This application claims the priority of U.S. Provisional Patent Application Ser. No. 60/555,837 filed Mar. 23, 2004.

BACKGROUND OF THE INVENTION

Many types of suspensions and supports include a spring and a damping device to help isolate that supported from the support structure or surface. For example, automotive vehicles commonly use separate springs and simple shock absorbers to support the vehicle frame on the axle assemblies. Simple shock absorbers are typically oil-filled cylinders within which a vented piston is mounted. The piston is connected to a shaft which extends out of one end of the cylinder. The outer end of the shaft is mounted to one point on the vehicle and the other end of the cylinder is mounted to another point on the vehicle in parallel with the suspension spring. Thus, simple shock absorbers only provide damping and not support.

Another type of shock absorber, which is the type commonly used with motorcycles, off-road vehicles, competition automotive vehicles and off-road bicycles, combines both the suspension function and the shock absorbing function in one unit. This second type of shock absorber commonly uses a spring unit to provide the suspension function coupled with a damping unit to provide the damping function. Conventional shock absorber designs commonly incorporate an external coil spring, an internal air spring, or an internal bladder to provide the suspension function.

Typical shock absorbers (also referred to as shocks) provide two kinds of damping: compression damping ("CD"), and rebound damping ("RD"). One refers to damping force created during "inward" travel of the shaft (shortening of the shock), the other refers to force created during "outward" travel of the shaft (lengthening of the shock). Generally, but not always—depending on linkage connecting shock to vehicle, RD applies during outward motion and CD applies during inward motion. Some shocks are externally adjustable by the user to provide for RD and/or CD adjustment.

Piston-type shock absorbers can be designed to provide the same amount of damping on both the compression stroke and the rebound stroke. Alternatively, the fluid passageways through the vented, damping piston can be designed so that the restriction to fluid flow through the damping piston during the compression stroke is different from the restriction to fluid flow during the rebound stroke. In this case the damping during the entire compression stroke is different from the damping during the entire stroke.

Another type of damping is called position-sensitive damping. Position-sensitive damping is typically achieved by the combination of conventional vented piston damping, with the oil flowing through the damping system, plus damping provided by the passage of oil around the damping piston through a bypass chamber or channel, which permits oil to bypass the piston during part of the piston stroke. The bypass channel permits lesser damping over the portion of the stroke during which some fluid flows around the piston through the bypass channel. Therefore, the shock can have different damping characteristics along different segments of the stroke. This is beneficial to the user because a single set of shocks can provide a smooth damping for less aggressive riding and firm damping for aggressive riding without making any adjustments during the ride. For example, the shocks can provide reduced damping in the mid-stroke zone, where the shock is most active in, for example, trail riding or other less aggressive riding. If the rider starts riding more aggressively, or hits a large bump, causing the shock to compress deeper into the stroke, the bypass damping then becomes available and the shock also relies on the conventional piston damping. This type of shock absorber has been available for many years.

U.S. Pat. No. 5,178,239 illustrates another example of a position-sensitive shock absorber. The position-sensitive damping action of the bypass channel is available during both the compression and rebound strokes. U.S. Pat. No. 6,415,895 is directed to shock absorbers, including position-sensitive shock absorbers in which the position-sensitive damping can be different during compression and rebound strokes and shock absorbers with damping adjusters which vary the damping provided during compression and rebound strokes. A further aspect is directed to a shock absorber including a cylinder with a piston moveably mounted within the cylinder.

It is an object of the invention to provide a novel shock absorber that provides both a suspension function and a damping function.

It is also an object of the invention to provide a novel shock absorber that has bypass passageways whose hydraulic fluid flow can be increased or decreased by external mechanical structure to vary the damping characteristics.

It is another object of the invention to provide a novel shock absorber that has bypass tubes having a kidney-shaped transverse cross section.

It is an additional object of the invention to provide a novel shock absorber that has unique check valves having kidney-shaped check valve pistons.

It is also an object of the invention to provide a novel shock absorber that has structure for increasing or decreasing the length of the external coil spring.

SUMMARY OF THE INVENTION

The problem with current products on the market is:

1: The only way to have an externally adjustable bypass shock is to have a separate emulsion shock to be used as a coil guide. What this does is provide a shock "guide" for the coil springs. For suspension damping a current bypass shock is used. Thus, on each corner of the car one must mount two separate shocks to have totally adjustable dampening control . . . eight shocks in total.

2: The other alternative is an "internal bypass shock." Essentially this achieves the same goals as applicant's invention except it is only adjustable internally. One can use one shock per wheel, and have as much adjustability as (1) above. However, the shock has to be removed from the vehicle and disassembled to adjust the damping within the shock. This is the major drawback to this shock. It isn't practical when one wants to adjust the shocks on demand and out in the field.

The way to solve both problems is to have an "externally adjustable internal bypass shock." What this achieves is not only the goal of using one shock per wheel, but also having the adjustability of using two present day separate components. Some highlights of the present invention are:

a) the shock absorber consists of an inner shock body with external bypass tubes and an outer threaded body to cover the bypass channels and allow a coil spring to be attached to the outside of the outer threaded body independent of the bypass channels;

b) the bulkhead allows each bypass channel to be attached adjacent to the shock body resulting in reduced overall diameter for the inner part of the shock;

c) there is an outer body consisting of a steel cylinder threaded externally for a shock adjuster to be installed for pre-loading of the springs;

d) check valves reside in the lower and/or upper bulkheads. These reside at the end of the bypass channel. Adjusting these check valves and/or the fluid available to them is what determines dampening characteristics.

The externally adjustable internal bypass shock has position-sensitive damping that can be different during compression and rebound strokes. There are adjuster rods which vary the damping provided during compression and rebound strokes.

The externally adjustable internal bypass shock absorber includes a cylindrical shock body within which a piston is moveably mounted for movement between the first and second ends of the cylinder. First and second bypass ports open into the cylinder exterior at axially spaced-apart positions. The bypass ports are coupled to bypass channels. The piston on the piston rod has a static position from which it initially starts traveling during compression. The distance to the first port aperture would be considered the first compression zone. Hydraulic fluid in the cylinder during this travel of the piston attempts to exit the port aperture and return to the rear of the piston through the bypass channels. The adjuster rod can be adjusted downwardly to leave the port aperture completely open, partially closed or completely closed. These changes will produce different dampening effects during Compression Zone 1 travel.

After the piston has passed the first port aperture, the hydraulic fluid is then pushed outwardly through the second port aperture which is closer to the top end of the shock body. This zone is identified as Compression Zone 2. It has a bypass channel connected to that port aperture. An adjuster rod can be moved up and down in the bypass channel to have the port completely open, partially closed or fully closed. These changes will affect the dampening effects in Compression Zone 2. Each of the described adjuster rods can be activated by the external bypass adjuster members located externally adjacent the top end of the shock. It is to be understood that additional port apertures could be formed along the length of the shock body to produce additional compression zones. On the rebound cycle the fluid is pushed downwardly in front of the rear end of the piston and forced radially outward and upwardly through a bypass tube that extends up to the top bulkhead. The top end of the bypass tube is closed by a check valve that has an adjuster rod pushing downwardly against it. The top end of this adjuster rod has an external bypass adjuster control which allows the operation of the check valve to be varied. This will produce different dampening effects on the rebound cycle.

DESCRIPTION OF THE PREFERRED EMBODIMENT

Figures 1, 2, 3:
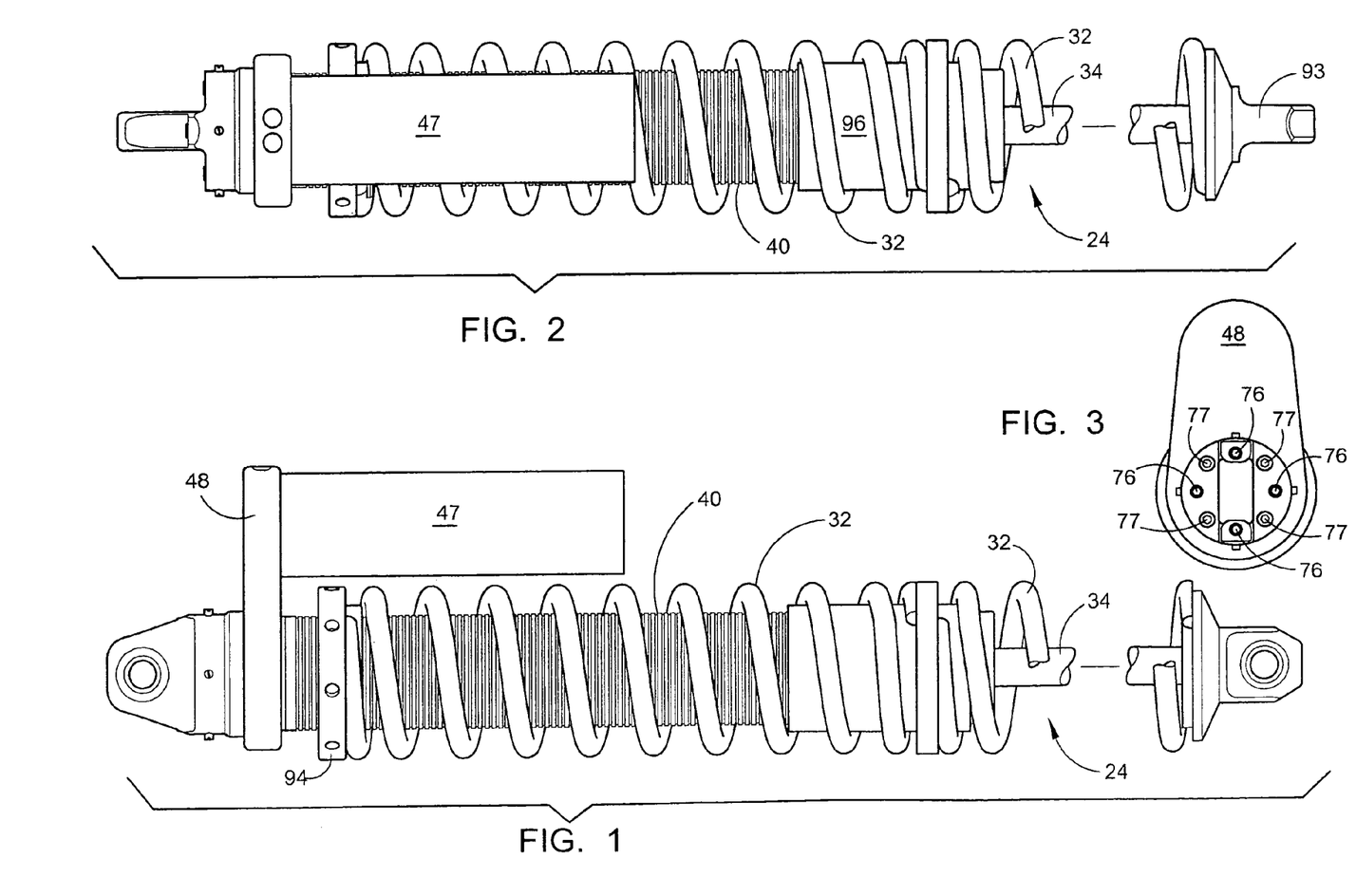
FIG. 1 is a top plan view of the novel shock absorber.
FIG. 2 is a rear elevation view of the shock absorber.
FIG. 3 is a left end view of the shock absorber.

The externally adjustable internal bypass shock absorber will now be described by referring to FIGS. 1-19 of the drawings. The shock absorber is generally designated numeral 24. FIGS. 1-3 show the shock absorber 24 completely assembled. The invention will be more easily understood by specifically describing the individual components and assemblies. This will be done by referring to the other drawings.

Figure 4:
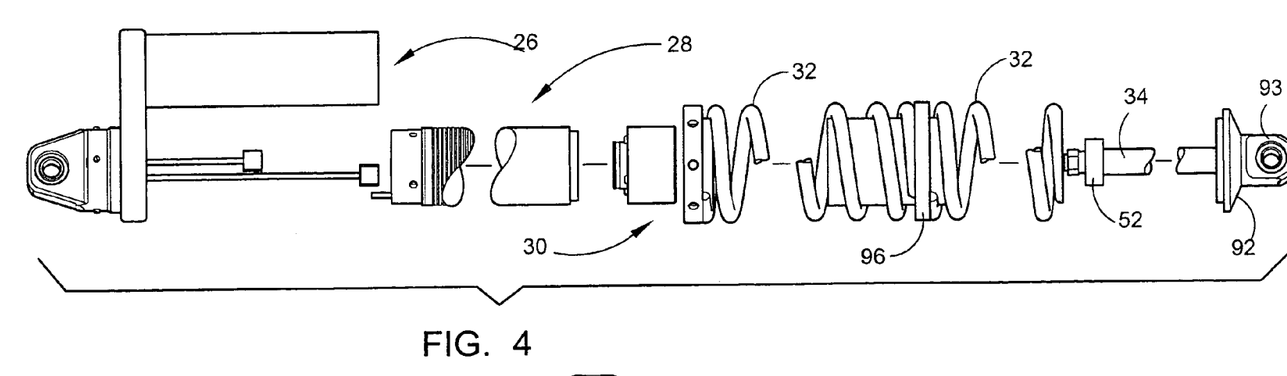
FIG. 4 is an exploded front perspective view of the shock absorber.
Figure 11:
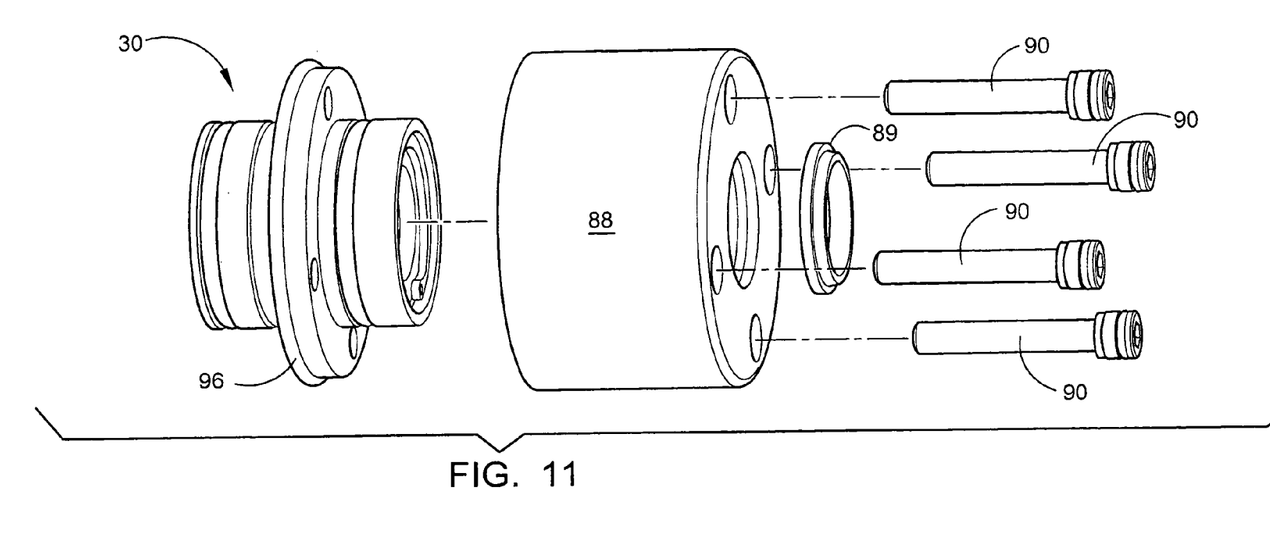
FIG. 11 is an exploded front perspective view that shows the assembly of the main seal body, the bottom cap and the wiper seal.
Figure 12:
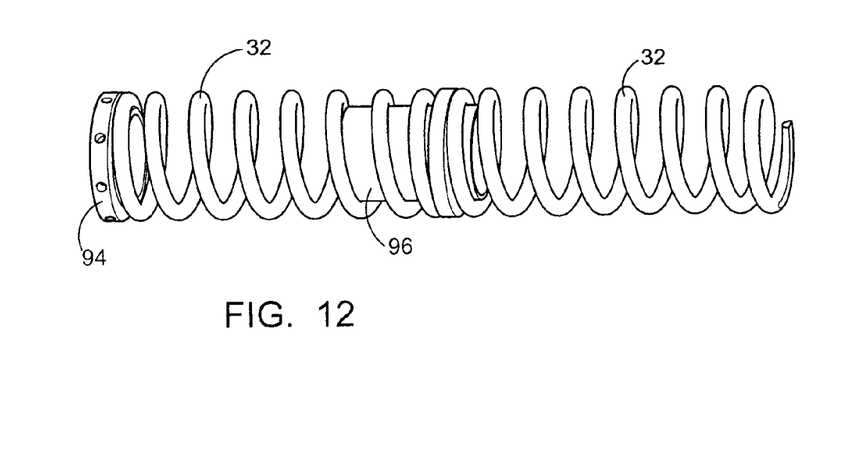
FIG. 12 is an exploded front perspective view of the coil spring and spring top collar.
Figure 13:
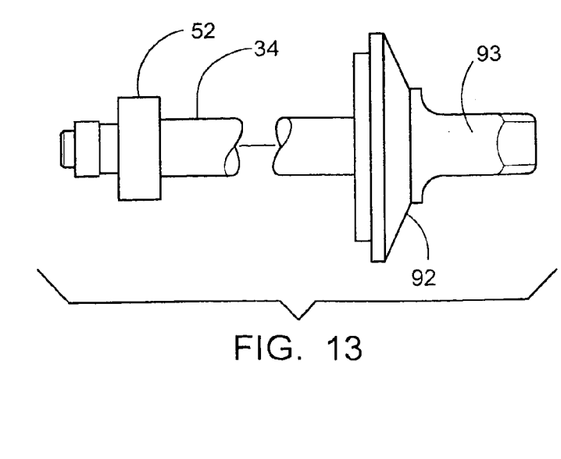
FIG. 13 is a side elevation view of the assembly of the piston, the piston rod and the spring bottom collar.

FIG. 4 is an exploded front perspective view of shock absorber 24. Numeral 26 identifies the top assembly (see FIG. 5). Numeral 28 identifies the main body assembly (see FIG. 6). The main seal body and assembly 30 is illustrated in FIG. 11. The coil spring 32 and its associated structure are illustrated in FIG. 12. The piston rod 34 and its associated structure are illustrated in FIG. 13.

Figures 6, 7A, 7B, 8A, 8B, 9A, 9B, 10A, 10B:
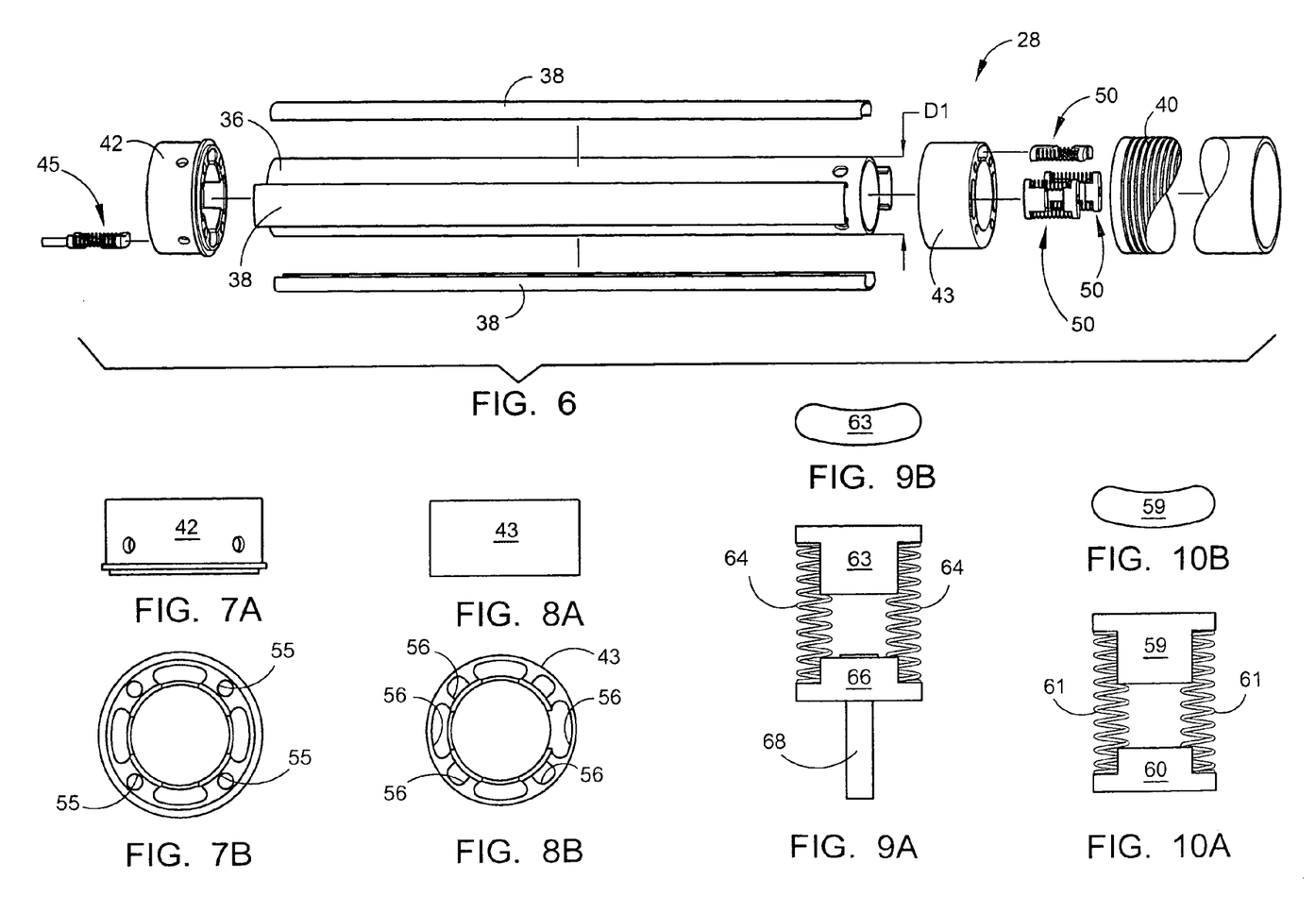
FIG. 6 is an exploded front perspective view of the main body assembly.
FIG. 7A is side elevation view of the top bulkhead.
FIG. 7B is a bottom plan view of the top bulkhead.
FIG. 8A is a side elevation view of the bottom bulkhead.
FIG. 8B is a top plan view of the bottom bulkhead.
FIG. 9A is a side elevation view of check valve A.
FIG. 9B is a top plan view of the check valve piston illustrated in FIG. 9A.
FIG. 10A is a side elevation view of check valve B.
FIG. 10B is a top plan view of the check valve piston illustrated in FIG. 10A.

The basic components of the shock absorber are clearly illustrated in FIG. 6. The shock body 36 is a hollow cylinder having an outer diameter D1. A plurality of bypass tubes or channels 38 are rigidly secured to the outer surface of shock body 36 by brazing or some other similar process. These bypass tubes have a transverse cross section that is kidney-shaped. The inner side wall surface of these bypass tubes is concave and the outer surface of the bypass tubes is convex. The concave side wall curvature mates with the outer surface of shock body 36. Although four bypass tubes 38 are illustrated, it is to be understood that fewer can be used or more bypass tubes can be used. Outer threaded body 40 telescopes over bypass tubes 38 with the inner surface of outer threaded body 40 pressed against the outer convex side wall surface of the respective bypass tubes 38. The space between adjacent bypass tubes form fluid passageways whose purpose will be understood later. A top bulkhead 42 is attached to the top end of shock body 36, bypass tubes 38 and outer threaded body 40. A bottom bulkhead 43 is attached to the bottom end of the same respective parts.

Top bulkhead 42 is illustrated in FIGS. 7A and 7B. Top bulkhead 42 houses the rebound check valves 45 and directs fluid back into the shock body 36. Top bulkhead 42 is bonded to the top end of shock body 36 and bypass tubes 38. The top bulkhead 42 also directs fluid from in between bypass tubes 38 out into the reservoir 47 via the manifold 48. FIG. 7B shows the bottom of top bulkhead 42. It has a plurality of outlets 55 that communicates with manifold 48 and reservoir 47.

Bottom bulkhead 43 uses the compression check valves 50 and directs fluid from the bypass tubes 38 back into shock body 36. Bottom bulkhead 43 also directs fluid inside the shock body, outside the bypass tubes 38 and into the top bulkhead 42 for direction to reservoir 47. Bypass tubes allow fluid to flow around the piston 52 (from above to below). These bypass tubes 38 direct the fluid to the check valves and this fluid forces them open or closed depending on the direction of travel of the piston. Piston rod 34 and piston 52 move dynamically within shock body 36. As the piston 52 travels up or down port holes in the shock body 36 allow oil to bypass the piston via the bypass tubes 38.

Bottom bulkhead 43 is illustrated in FIGS. 8A and 8B. FIG. 8B is a top view of bottom bulkhead 43. It shows a plurality of compression check valve guides 56 for receiving compression valves 50. The specific structure of compression valves 50 is illustrated in FIGS. 10A and 10B. They have a check valve piston 59 separated from a check valve stop 60 by a plurality of springs 61.

Rebound check valve 45 is illustrated in FIGS. 9A and 9B. It has a check valve piston 63 separated from a check valve stop 66 by coil springs 64. A threaded stud 68 functions just like the adjuster rods 70. When the bypass adjuster 76 is turned, this moves the check valve stop 68 up or down allowing the check valve to let more or less fluid bypass the piston 52. The check valve springs 61 and 64 keep the respective check valves closed during rebound or compression and open during rebound or compression depending which direction the valve is placed. The check valve stops 60 and 66 can be stationery or the position can be moved to determine how much the respective check valve pistons are allowed to open. This also determines damping characteristics of a particular zone within the shock.

Figure 5:
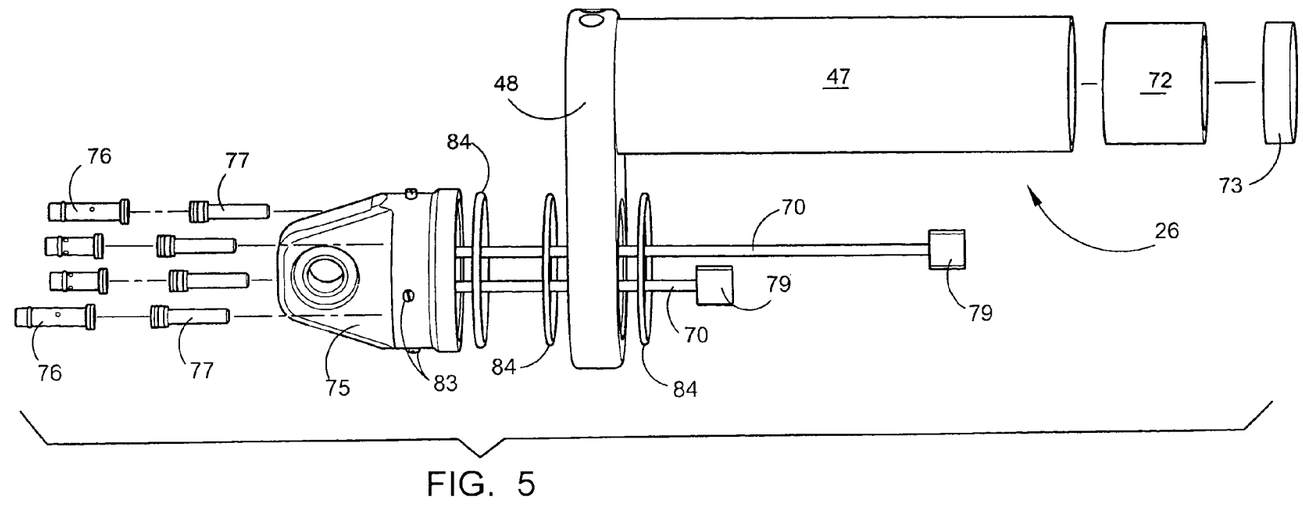
FIG. 5 is an exploded front perspective view of the top assembly.

FIG. 5 shows the top assembly 26 that is attached to the top end of the main body assembly 28. Reservoir 47 is a hollow cylindrical metal tube within which a piston 72 is telescopically received. The internal chamber formed between the bottom end of manifold 48 and the top end of reservoir piston 72 is the reservoir for extra oil to be stored. Between the bottom end of reservoir piston 72 and the bottom end cap 73 is formed a second chamber that would be filled with pressurized gas. The function of the reservoir is to store extra oil. This allows displacement of oil as piston rod 34 is compressed in and out of the shock body 36. The top 75 of the shock houses the bypass adjusters 76 and is secured to the top end of the main body assembly 28 by bolts 77. The top 75 of the shock is bolted to the vehicle. Bolts 77 threads into tap holes in the top bulkhead 42.

There is an adjuster block 79 connected to the bottom end of each of the adjuster rods 70. The adjuster blocks are moved up and down to close off or open the port apertures in shock body 36 that allow fluid to flow downwardly through the bypass tubes 38 to the check valves 50. The location of these adjuster blocks 79 determines the damping characteristics of the particular position of the piston within shock body 36. The dynamic part of the check valve assemblies 50 is the check valve piston 59. It is spring loaded and when fluid is forced down via the bypass tubes, the check valve piston will move downwardly opening a hole in the bottom bulkhead 43. This allows fluid to travel back down beneath the piston 52. The top ends of adjuster rods 70 have external threads that thread into the bypass adjusters 76. When the bypass adjuster 76 is turned for adjustment, it moves the adjuster rod up or down. Spring loaded ball plungers 83 are threaded into the top 75 of the shock and extend into the bypass adjusters 76. There is a corresponding detent in the bypass adjuster. After adjustment this ball plunger keeps the bypass adjuster from rotating. Manifold seals 84 seal the manifold 48 to the top bulkhead 42. Manifold 48 channels oil from inside the threaded shock body into reservoir 47.

Main seal body and assembly 30 is illustrated in FIG. 11. It is the housing for the main shock seal. This housing is sandwiched between the shock bottom aluminum cap 88 and the bottom bulkhead 43. It contains outer o-rings to center itself within bottom bulkhead 43. Wiper seal 89 surrounds piston rod 34. Bolts 90 secure bottom cap 88 and main seal body and assembly 30 to bottom bulkhead 43.

FIG. 13 shows piston 52 mounted on one end of piston rod 34. Spring bottom collar 92 is mounted on the other end of piston rod 34. Attached thereto is piston rod end 93. Spring bottom collar 92 serves as a bottom stop for coil spring 32. It also keeps the coil spring concentric about the shock assembly. Piston rod end 93 bolts to the particular vehicle using the shock.

FIG. 12 shows a spring guide 96 that helps guide the spring 32 up and down the outer threaded body 40. It also serves as a stop if one so chooses to use a secondary spring set up. The front end of coil spring 32 is captured in spring top collar 94. Spring top collar 94 is threaded internally and threads onto the outer threaded body 40. The movement of spring top collar up or down adjusts the pre-load on the coil spring.

Figure 16:
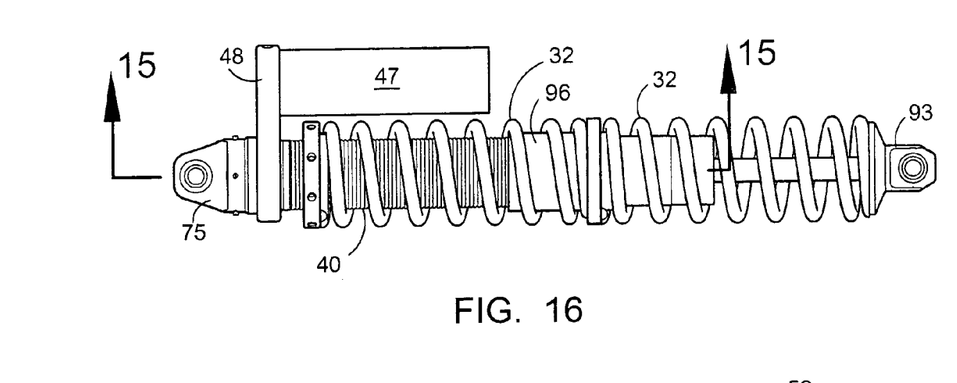
FIG. 16 is a side elevation view of the shock absorber showing Compression Zone 2.
Figure 17:
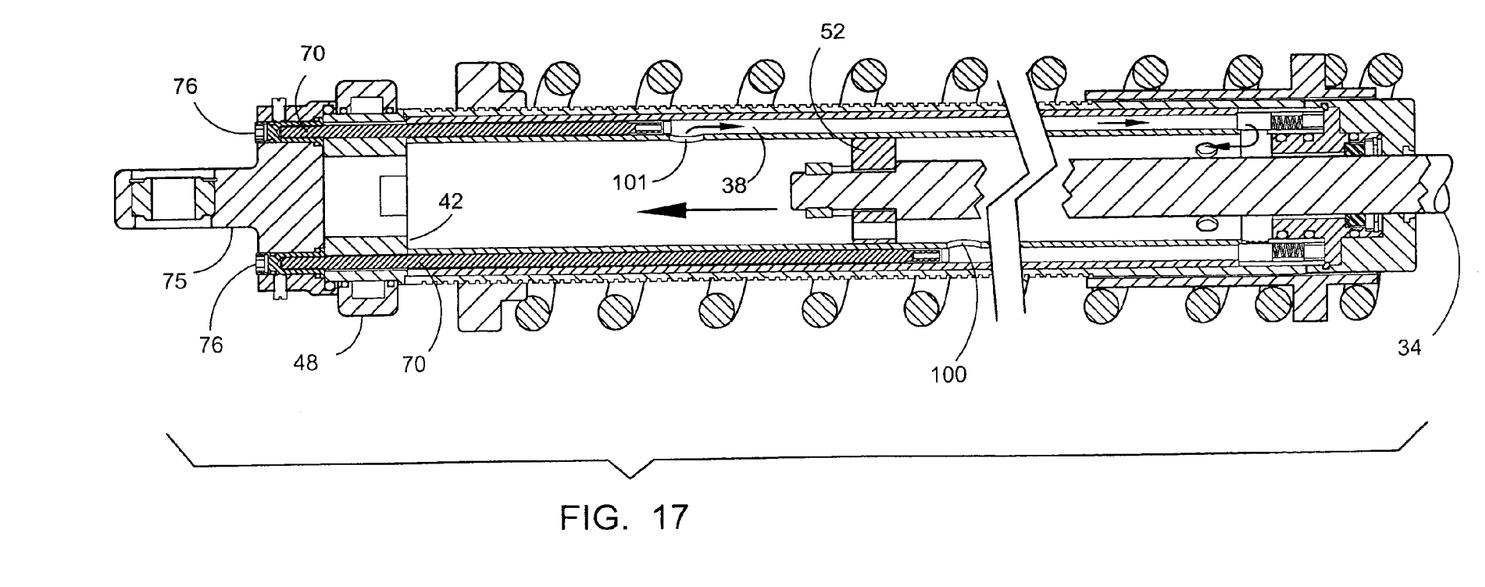
FIG. 17 is a cross sectional view taken along lines 17-17 of FIG. 16.
Figure 18:
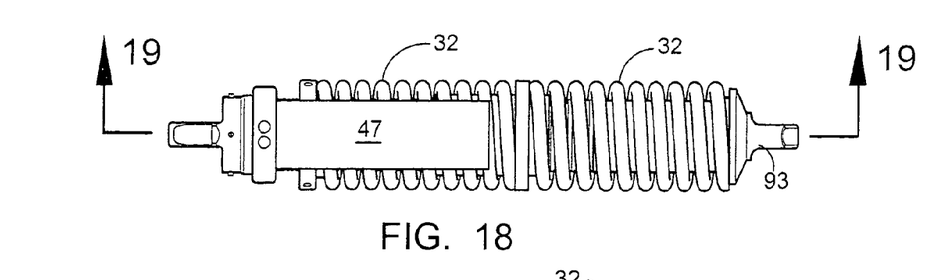
FIG. 18 is a side elevation view of the shock absorber during the Rebound Cycle.
Figure 19:
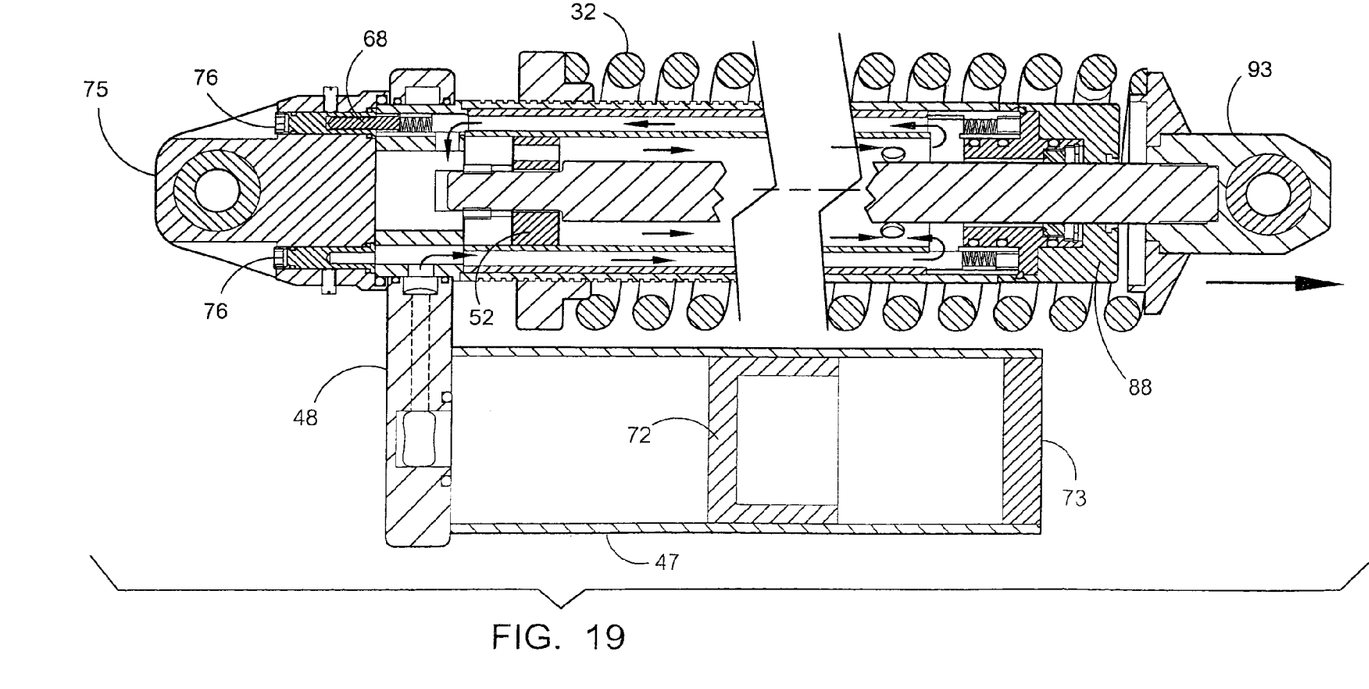
FIG. 19 is a cross sectional view taken along lines 19-19 of FIG. 18.

The manner in which the externally adjustable internal bypass shock absorber functions will be discussed by referring to FIGS. 14-19. FIGS. 14-17 relates to the compression stroke. FIGS. 18 and 19 relate to the rebound cycle.

Figures 14, 15:
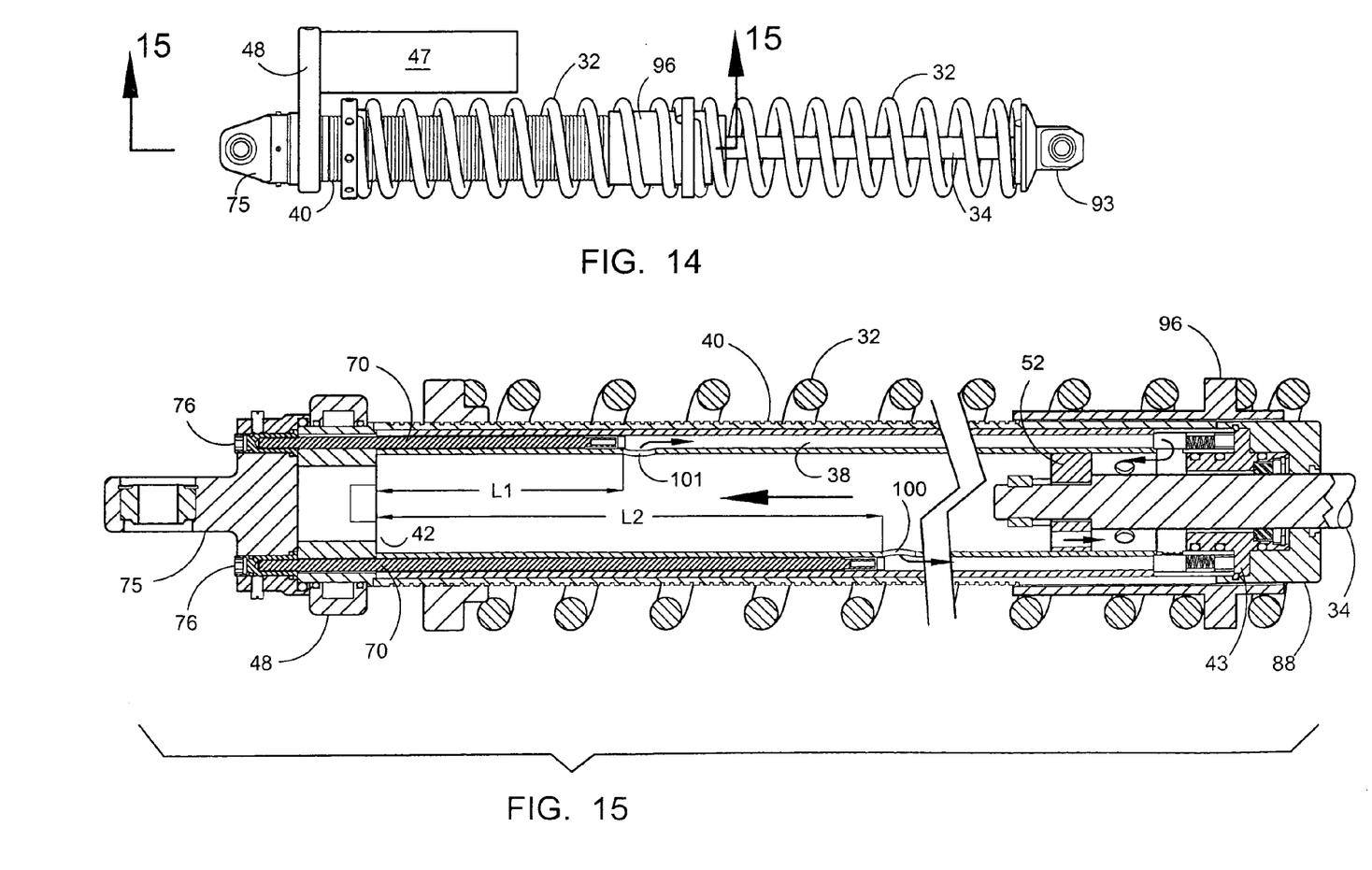
FIG. 14 is a side elevation view of the shock absorber showing Compression Zone 1.
FIG. 15 is a cross sectional taken along lines 15-15 of FIG. 14.

FIGS. 14-15 relates to the action that takes place in Compression Zone 1. When piston rod 34 is traveling upwardly through shock body 36, piston 52 compresses the fluid in the interior chamber of shock body 36. Piston 52 has a plurality of bore holes that allow some hydraulic fluid to pass through them on this compression stroke. This provides a damping effect. Part way up the interior of shock body 36 there is a port hole 100 that is a distance L2 from the top bulkhead 42. The lower end of adjuster rod 70 is not covering port 100 and this allows some of the hydraulic fluid to travel rearwardly through bypass tube 38 against check valves 50 causing check valve piston 5a to be depressed and allowing the hydraulic fluid back into the interior chamber behind piston 52. This also provides a damping function for Compression Zone 1. FIGS. 16 and 17 show the piston 52 traveling further along the interior chamber. A second port hole 101 is located a predetermined distance L1 from top bulkhead 42. At this point piston 52 has already passed port aperture 100 and therefore the fluid in front of it is forced through port 101 and down bypass tube 38 against check valves 50 causing check valve piston 59 to be depressed and allowing the hydraulic fluid to enter back into the interior chamber behind piston 52.

The Rebound Cycle is illustrated in FIGS. 18-19. As piston 52 travels rearwardly, hydraulic fluid is pushed rearwardly toward bottom bulkhead 43 and radially outward and upward through bypass tube 38. This fluid then compresses check valve 45 which allows the fluid to enter back into the interior chamber. Adjustment of the various bypass adjusters can vary the damping effects in the different Compression Zones and different Rebound Zones.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended Claims.

What is claimed is:

1. An externally adjustable internal bypass shock absorber comprising:

an elongated cylindrical shock body having an interior chamber, a top end, a bottom end, an outer surface, an outer diameter (D1), a longitudinally extending X-axis; a first radial port located a predetermined first distance (L1) from said top end; a second radial port located a predetermined distance (L2) from said top end and (L2) is greater than (L1);

a piston mounted on an end of a piston rod; said piston rod having a front end and a rear end; said piston being movably mounted within said cylindrical shock body for movement between said top end and said bottom end; said piston having a front end and a rear end;

an outer cylindrical housing having a top end, a bottom end, an outer surface, an inner surface, an X-axis, an inner diameter (B2) and (B2) is greater than (D1); said outer surface of said cylindrical shock body being telescopically received in said outer cylindrical housing thereby forming an annular chamber between said inner surface of said outer cylindrical housing and said outer surface of said cylindrical shock body;

a plurality of elongated bypass tubes each having a top end, a bottom end, an inner surface, an outer surface; said bypass tubes being longitudinally positioned in said annular chamber; one of said bypass tubes having a bypass port that aligns with said first radial port of said cylindrical shock body; one of said bypass tubes having a bypass port that aligns with said second radial port of said cylindrical shock body;

an external reservoir containing hydraulic fluid;

a top bulkhead connecting to said top end of said cylindrical shock body and said top end of said outer cylindrical housing; said top bulkhead having a front end and a rear end;

wherein said annular chamber between said respective bypass tubes define fluid passageways that communicate with said top bulkhead, and further wherein said top bulkhead has fluid passageways that communicate with a reservoir manifold wherein said reservoir manifold has fluid passageways that communicate with said external reservoir;

a bottom bulkhead connected to said bottom end of said cylindrical shock body and said bottom end of said outer cylindrical housing; said bottom bulkhead having a front end and a rear end; a top end attachment member connected to said front end of said top bulkhead for attachment to a vehicle frame;

further comprising check valves located in said front end of said bottom bulkhead that align with said bottom ends of said bypass tubes wherein said check valves have kidney-shaped check valve pistons that mate with the bottom ends of said bypass tubes that also have a kidney-shaped horizontal cross sectional configuration and further wherein said front end of said bottom bulkhead has kidney-shaped guide recesses for receiving said respective check valves;

a bottom end attachment member connected to said rear end of said piston rod for attachment to a vehicle suspension;

a coil spring having a front end and a rear end;

said outer cylindrical housing being telescopically positioned within said coil spring;

means on said outer surface of said cylindrical housing for capturing said front end of said coil spring;

means on said bottom end attachment member for capturing said rear end of said coil spring;

means connecting said hydraulic fluid in said external reservoir to said interior chamber of said cylindrical shock body; and hydraulic fluid flow control means located externally of the assembled internal bypass shock for covering and uncovering said first and said second radial ports of said cylindrical shock body for opening or restricting flow of hydraulic fluid through said first and said second radial ports and their respective aligned bypass ports of bypass tubes.

2. An externally adjustable internal bypass shock absorber as recited in claim 1 wherein said piston has at least one bore hole extending through said piston from said front end to said rear end.

3. An externally adjustable internal bypass shock absorber as recited in claim 1 wherein a portion of said outer surface of each of said bypass tubes is rigidly secured to said outer surface of said cylindrical shock body.

4. An externally adjustable internal bypass shock absorber as recited in claim 1 wherein a portion of said outer surface of said bypass tubes has a curved shape that mates with said outer surface of said cylindrical shock body.

5. An externally adjustable internal bypass shock absorber as recited in claim 4 wherein a portion of said outer surface of said bypass tubes has a curved shape that mates with said inner surface of said outer cylindrical housing.

6. An externally adjustable internal bypass shock absorber as recited in claim 4 wherein said bypass tubes are rigidly secured to said outer surface of said cylindrical shock body.

7. An externally adjustable internal bypass shock absorber as recited in claim 1 further comprising a spring guide captured inside said coil spring intermediate said front end and said rear end of said coil spring.

8. An externally adjustable internal bypass shock absorber as recited in claim 1 wherein said means for capturing said front end of said coil spring is a spring top collar that has an internally threaded borehole.

9. An externally adjustable internal bypass shock absorber as recited in claim 8 wherein a major portion of the outer surface of said outer cylindrical housing is externally threaded and said spring top collar is screwed thereon.

10. An externally adjustable internal bypass shock absorber as recited in claim 9 wherein said means for capturing said rear end of said coil spring is a spring bottom collar.

11. An externally adjustable internal bypass shock absorber as recited in claim 1 wherein said hydraulic fluid flow control means comprises a plurality of elongated adjuster rods each having a top end and a bottom end; an adjuster block is secured to said respective bottom end; said adjuster rods and adjuster blocks are positioned in said respective bypass tubes.

12. An externally adjustable internal bypass shock absorber as recited in claim 11 wherein said adjuster blocks each have an inside wall having a shape that mates with said outer surface of said cylindrical shock body.

13. An externally adjustable internal bypass shock absorber as recited in claim 12 wherein said top ends of said adjuster rods are connected to respective individual bypass adjusters that are externally accessible so that said adjuster blocks can be raised and lowered to cover and uncover said respective radial ports of said cylindrical shock body.

14. An externally adjustable internal bypass shock absorber comprising:

an elongated cylindrical shock body having an interior chamber, a top end, a bottom end, an outer surface, an outer diameter (D1), a longitudinally extending X-axis; a first radial port located a predetermined first distance (L1) from said top end; a second radial port located a predetermined distance (L2) from said top end and (L2) is greater than (L1);

a piston mounted on an end of a piston rod; said piston rod having a front end and a rear end; said piston being movably mounted within said cylindrical shock body for movement between said top end and said bottom end; said piston having a front end and a rear end;

an outer cylindrical housing having a top end, a bottom end, an outer surface, an inner surface, an X-axis, an inner diameter (B2) and (B2) is greater than (D1); said outer surface of said cylindrical shock body being telescopically received in said outer cylindrical housing thereby forming an annular chamber between said inner surface of said outer cylindrical housing and said outer surface of said cylindrical shock body;

an external reservoir containing hydraulic fluid;

a bottom end attachment member connected to said rear end of said piston rod for attachment to a vehicle suspension;

a coil spring having a front end and a rear end;

said outer cylindrical housing being telescopically positioned within said coil spring;

means on said outer surface of said outer cylindrical housing for capturing said front end of said coil spring;

means on said bottom end attachment member for capturing said rear end of said coil spring;

a top bulkhead and a bottom bulkhead wherein said annular chamber between said inner surface of said outer cylindrical housing and said outer surface of said cylindrical shock body define fluid passageways that communicate with said top bulkhead, and further wherein said top bulkhead has fluid passageways that communicate with a reservoir manifold wherein said reservoir manifold has fluid passageways that communicate with said external reservoir;

and further comprising check valves located in said bottom bulkhead wherein said check valves have kidney-shaped check valve pistons that mate with said bottom bulkhead that also have a kidney-shaped horizontal cross sectional configuration and further wherein said bottom bulkhead has kidney-shaped guide recesses for receiving said respective check valves;

means connecting said hydraulic fluid in said reservoir to said interior chamber of said cylindrical shock body; and hydraulic fluid flow control means located externally of the assembled internal bypass shock for adjusting the amount of hydraulic fluid that can bypass said piston outside of said cylindrical shock body.

* * * * *